United States Patent [19]

Lee

[11] Patent Number: 5,547,244
[45] Date of Patent: Aug. 20, 1996

[54] CANOPY MOUNTING DEVICE FOR A SKID STEER LOADER

[75] Inventor: Seung K. Lee, Incheon, Rep. of Korea

[73] Assignee: Daewoo Heavy Industries Ltd., Incheon, Rep. of Korea

[21] Appl. No.: 366,714

[22] Filed: Dec. 30, 1994

[30]   Foreign Application Priority Data

Dec. 30, 1993 [KR]   Rep. of Korea ............... 93-31190 U

[51] Int. Cl.$^6$ ................................................ B62D 33/07
[52] U.S. Cl. ...................... 296/102; 296/190; 180/89.14
[58] Field of Search ................................. 296/102, 190; 180/89.13, 89.14, 89.15, 89.16, 89.17, 89.18, 89.19

[56]   References Cited

U.S. PATENT DOCUMENTS

| | | | |
|---|---|---|---|
| 3,958,859 | 5/1976 | Selman | 296/190 |
| 4,408,672 | 10/1983 | Albright et al. | 180/89.14 |
| 5,398,774 | 3/1995 | Nilsson et al. | 296/190 |

*Primary Examiner*—Dean Kramer
*Attorney, Agent, or Firm*—Lowe, Price, LeBlanc & Becker

[57]   ABSTRACT

A canopy mounting device for a skid steer loader adapted for pivotally mounting a canopy on a vehicle body with a gas spring disposed between the canopy and the vehicle body in a preloaded condition, comprises: a bracket fixedly secured to the vehicle body, the bracket having a first through-hole; a hinge block attached to the canopy, the hinge block having an interlocking lug at an upper end thereof, a second through-hole formed adjacent to a lower end thereof and an abutment surface extending downward from the interlocking lug; a pivot pin inserted through the first and second through-holes to enable the canopy to be pivoted with respect to the vehicle body between a first closed position and a second open position; an interlocking ring for holding the canopy against pivotal movement into the first closed position, the interlocking ring engaged with the interlocking lug of the hinge block when the canopy is in the second open position; and a height-adjustable stopper for coming into contact with the abutment surface of the hinge block as the canopy is pivoted to the second open position.

6 Claims, 2 Drawing Sheets

5,547,244

CANOPY MOUNTING DEVICE FOR A SKID STEER LOADER

FIELD OF THE INVENTION

The present invention is directed to a canopy mounting device for pivotally mounting the canopy of a skid steer loader on a vehicle body and, more particularly, to a canopy mounting device which allows a preloaded gas spring to be manually installed with ease between the canopy and the vehicle body.

DESCRIPTION OF THE PRIOR ART

In a typical skid steer loader, a canopy or overhead framework is pivotally mounted on the top of a vehicle body through a pivot pin in order to protect the driver in the process of driving the loader. The canopy must be pivoted into an open position when maintenance or repair is needed for various parts or instruments which are installed on the vehicle body. To facilitate the pivotal movement of the canopy, it should be pivotally attached to the rear frame of the vehicle body with a gas spring interposed between the canopy and the vehicle body. Since the canopy of the skid steer loader generally weighs over 100 kg, the gas spring is required to be disposed between the canopy and the vehicle body in a preloaded condition to have a dead extension stroke, thus biasing the canopy toward the open position. In addition, the gas spring should preferably have a dead retraction stroke to avoid undue retraction which would otherwise leads to breakage of a sealing system and the like.

To mount the gas spring between the canopy and the vehicle body in a preloaded condition, the gas spring is first retracted forcedly to an extent that the dead retraction stroke becomes available. However, the task of compulsively retracting the gas spring is very hard to be done manually; and a specially designed tool such as jigs and the like needs to be used for that purpose. The use of the special tool, however, would present a drawback in that it tends to make the spring retraction operation highly tedious and time-consuming.

SUMMARY OF THE INVENTION

Accordingly, it is an object of the invention to provide a canopy mounting device for a skid steer loader which enables a gas spring to be mounted in a preloaded condition between a canopy and a vehicle body without the need to use a special tool.

To achieve the above object, the present invention provides a canopy mounting device for a skid steer loader adapted for pivotally mounting a canopy on a vehicle body with a gas spring disposed between the canopy and the vehicle body in a preloaded condition, which comprises: a bracket fixedly secured to the vehicle body, the bracket having a first through-hole; a hinge block attached to the canopy, the hinge block having an interlocking lug at an upper end thereof, a second through-hole formed adjacent to a lower end thereof and an abutment surface extending downward from the interlocking lug; a pivot pin inserted through the first and second through-holes to enable the canopy to be pivoted with respect to the vehicle body between a first closed position and a second open position; an interlocking ring for holding the canopy against pivotal movement into the first closed position, the interlocking ring engaged with the interlocking lug of the hinge block when the canopy is in the second open position; and a height-adjustable stopper for coming into contact with the abutment surface of the hinge block as the canopy is pivoted to the second open position.

BRIEF DESCRIPTION OF THE DRAWINGS

Other objects, features and advantages of the invention will become apparent from the following description of the preferred embodiment taken in conjunction with the accompanying drawings in which.

DETAILED DESCRIPTION OF THE PREFERRED EMBODIMENT

Figure 1:
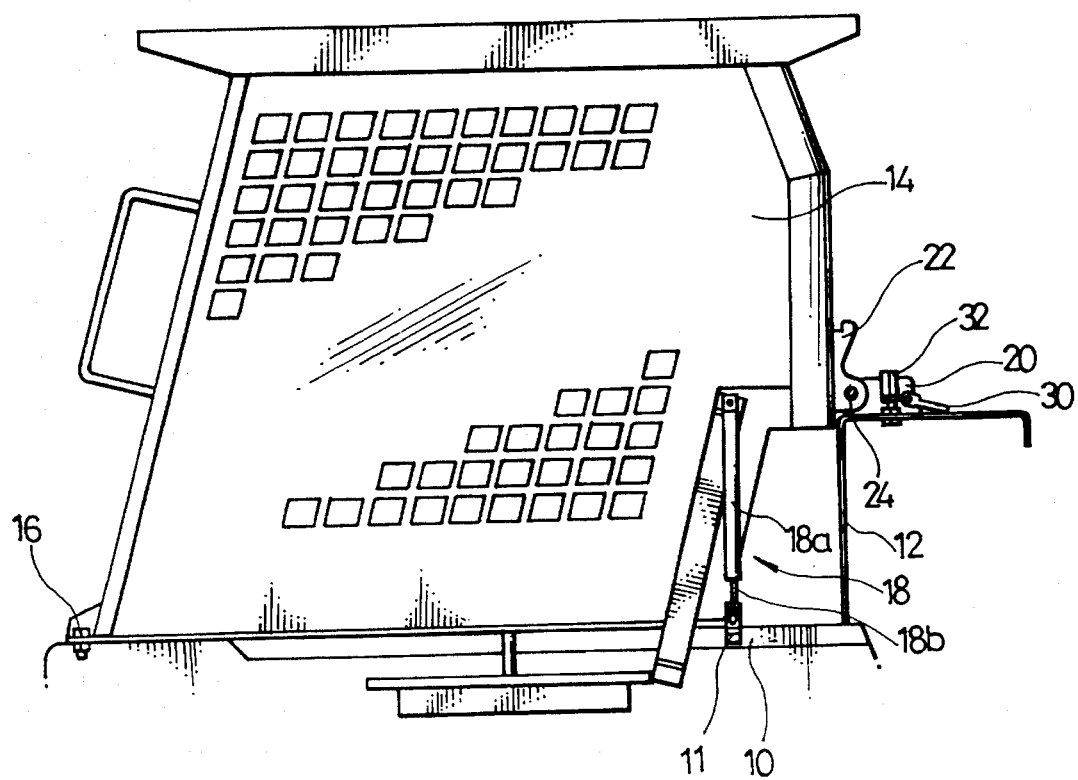
FIG. 1 is a partially cut away side elevational view of a skid steer loader employing a canopy mounting device in accordance with the invention, with the canopy in its closed position.
Figure 3:
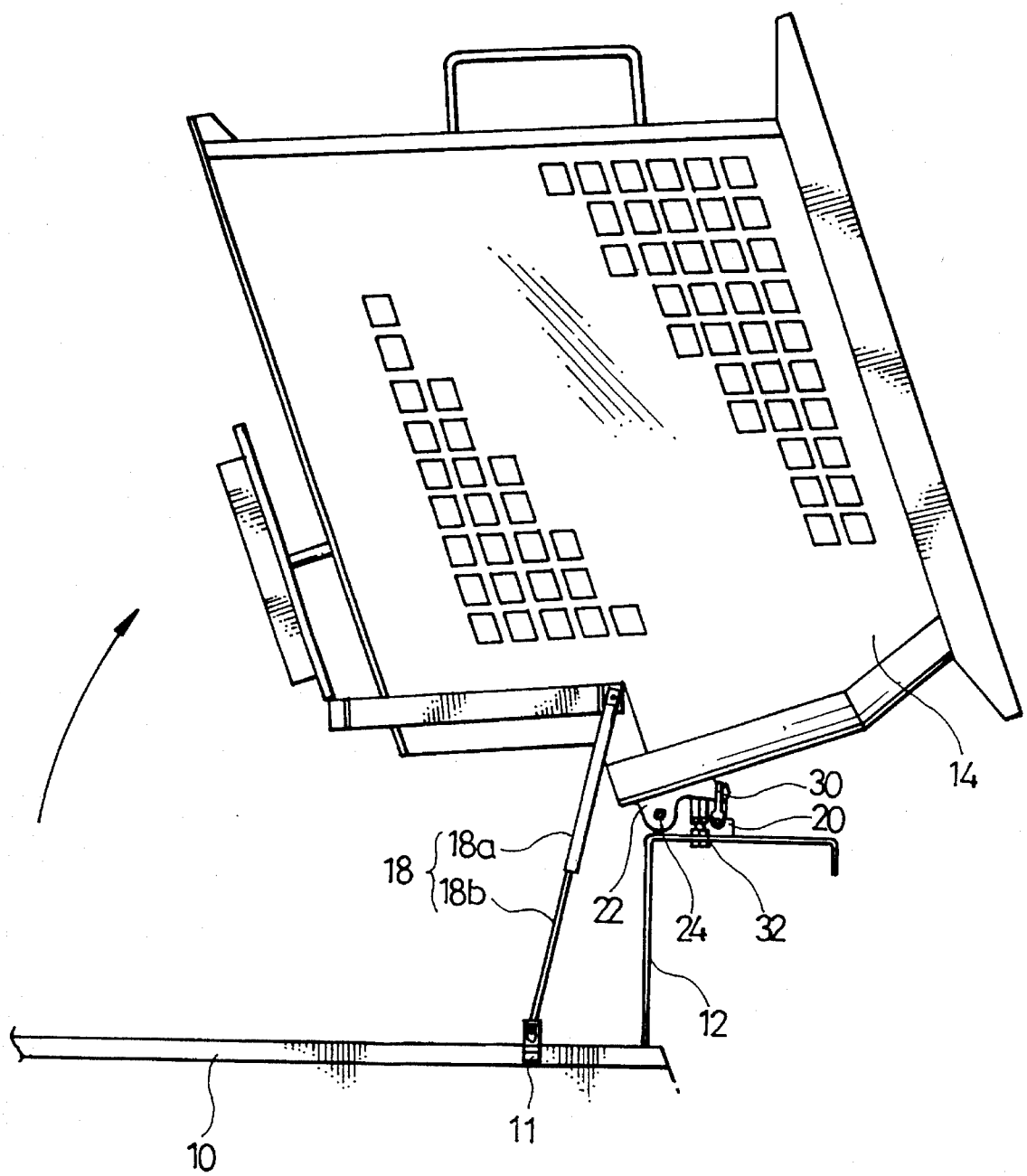
FIG. 3 is a side elevational view similar to FIG. 1 but showing the canopy in its open position.

Referring now to FIG. 1, there is shown, as a partially cut away side elevational view, a skid steer loader which employs a canopy mounting device in accordance with the invention. The skid steer loader includes a vehicle body 10 to which a rear frame 12 is attached and a canopy which is installed pivotally on the vehicle body 10 to define a cabin. The canopy remains normally in a closed position as shown in FIG. 1, but it is pivoted into an open position as shown in FIG. 3 when repair work for an engine or other parts lying beneath the cabin is intended to be carried out. And the canopy 14 has a latch 16 at its frontal lower end which acts to releasably lock the canopy 14 on the vehicle body 10.

Between the canopy 14 and the vehicle body 10, there is provided a gas spring 18 designed to urge the canopy 14 into the open position. The gas spring 18 comprises a cylinder 18a which is pivotably secured to the canopy and a piston rod 18b which is fitted in the cylinder 18a in an extensible manner. A compressed gas is held within the cylinder 18a to apply an extension force to the piston rod.

Figure 2A:
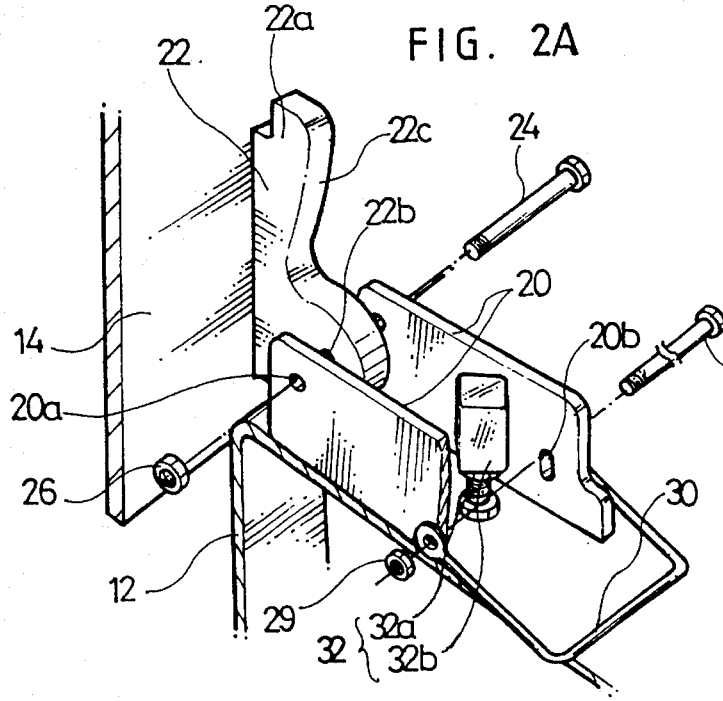
FIG. 2A is an enlarged perspective view showing the canopy mounting device in more detail.
Figure 2B:
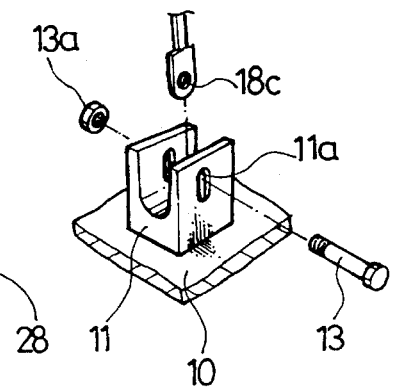
FIG. 2B shows a fixture block and a coupling pin for retaining the gas spring on the vehicle body removably.

As clearly shown in FIG. 2B, the piston rod 18b is provided at its free end with a pivot hole 18c and may be pivotally secured to a generally U-shaped fixture block 11 having a slot 11a. Inserted through the pivot hole 18c and the slot 11a is a coupling pin 13 that carries a nut 13a at one end thereof. The gas spring 18 is so arranged between the canopy 14 and the vehicle body 10 that it can have a predetermined dead retraction stroke and a predetermined dead extension stroke.

The dead retraction stroke refers to the distance between a fixed end of the cylinder 18a and an internal end of the piston rod 18b when the canopy 14 is in the closed position as depicted in FIG. 1 and the dead extension stroke is intended to mean the distance between the free end of the cylinder 18a and the internal end of the piston rod 18b when the canopy 14 is kept in the open position as shown in FIG. 3. Assuming that the gas spring 18 has a fully retracted length of 340 mm and a fully extended length of 585 ram, it should be desirable that the dead retraction stroke is set to be, e.g., 20 ram, and that the dead extension stroke is set to be, e.g., 30 min. Selecting the dead retraction stroke in this way makes it possible to prevent the internal pressure of the gas spring 18 from excessive increase as the canopy 14 is pressed into the closed position. Likewise, allowing for the dead extension stroke assures that the canopy 14 should continue to be biased into the open position, thus preventing the canopy 14 from inadvertent swing movement back to the closed position.

Referring to FIG. 2A, it can be seen that the rear frame 12 of the vehicle body 10 is provided with a bracket 20 having a through-hole 20a and a slot 20b. Attached to the canopy 14 is a hinge block 22 which includes an interlocking lug 22a projecting upward at the upper end thereof, a second through-hole 22b formed adjacent to the lower end thereof and a sloping abutment surface 22c extending downward from the interlocking lug 22a. A pivot pin 24 passes through the first and second through-holes 20a, 22b, so that the canopy 14 may be pivoted between the closed position as shown in FIG. 1 and the open position as illustrated in FIG. 3. A nut 26 is threadedly fitted to the distal end of the pivot pin 24.

Passing through the slot 22b of the bracket 20 is a sliding pin 28 for supporting an interlocking ring 30 pivotably. The sliding pin 28 carries at its distal end a nut 29. The interlocking ring 30 is intended to inhibit the canopy 14 from returning back to the closed position by engaging the interlocking lug 22a of the hinge block 22, when the canopy 14 lies in the open position. Extending upwardly between the hinge block 22 and the interlocking ring 30 is a height-adjustable stopper 32. This stopper 32 comprises a stud bolt 32a affixed to the rear frame 12 and a stopper head 32b threadedly joined with the stud bolt 32a. Preferably, the stopper head 32b is made of a relatively soft and less brittle material, e.g., synthetic resin, to absorb the shock which might occur at the time of collision of the hinge block 22 to the stopper 32. Furthermore, the stopper 32 has preferably an adjustable height greater than the angular movement extent of the hinge block 22 that corresponds to the dead extension stroke of the gas spring 18.

By using the canopy mounting device shown in FIG. 2A, the gas spring 18 can be readily installed in a preloaded state between the canopy 14 and the vehicle body 10 with no aid of a special tool. The technique of installing the gas spring 18 will now be set forth. First, the cylinder 18a of the gas spring 18 is pivotably attached to an appropriate portion of the canopy 14, with the stopper head 32b removed from the stud bolts 32a. Subsequently, the canopy 14 is pivoted about the pivot pin 24 from the closed position shown in FIG. 1 to the open position shown in FIG. 3. For the safety purpose, the interlocking ring 30 is caused to engage the interlocking lug 22a of the hinge block 22 to avoid inadvertent pivotal movement of the canopy 14 toward the closed position. In this state, the piston rod 18b of the gas spring 18 remains completely extended from the cylinder 18a, making it possible to affix the lower end of the piston rod 18b to the fixture block 11 by means of the coupling pin 13 with no difficulty.

After the piston rod 18b has been secured to the fixture block 11, the canopy 14 is pivoted again to the closed position and the stopper head 32b is joined with the stud bolt 32a at an appropriate height. As a result, the angle of pivoting the canopy 14 into the open position is diminished by the height of the stopper head 32b, because the abutment surface 22c of the hinge block 22 will hit against the stopper head 32 as the canopy 14 is swung toward the open position. Accordingly, the gas spring 18 is allowed to have the dead extension stroke which in turn enables the gas spring 18 to be kept in a preloaded state even at the open position. The dead extension stroke depends on the adjusted height of the stopper head 32b. In addition, the dead retraction stroke of the gas spring 18 varies with the distance between the fixed ends of the cylinder 18a and the piston rod 18b, as measured at the time when the canopy 14 is kept in the closed position.

While the invention has been shown and described with reference to a preferred embodiment, it should be apparent to those skilled in the art that many changes and modifications may be made without departing from the spirit and scope of the invention as defined in the claims.

What is claimed is:

1. A canopy mounting device for a skid steer loader adapted for pivotally mounting a canopy on a vehicle body with a gas spring disposed between the canopy and the vehicle body in a preloaded condition, which comprises:

a bracket fixedly secured to the vehicle body, the bracket having a first through-hole;

a hinge block attached to the canopy, the hinge block having an interlocking lug at an upper end thereof, a second through-hole formed adjacent to a lower end thereof and an abutment surface extending downward from the interlocking lug;

a pivot pin inserted through the first and second through-holes to enable the canopy to be pivoted with respect to the vehicle body between a first closed position and a second open position;

an interlocking ring for holding the canopy against pivotal movement into the first closed position, the interlocking ring engaged with the interlocking lug of the hinge block when the canopy is in the second open position; and a height-adjustable stopper for coming into contact with the abutment surface of the hinge block as the canopy is pivoted to the second open position.

2. The canopy mounting device as recited in claim 1, wherein the stopper comprises a stud bolt fixedly attached to the vehicle body and a stopper head threadedly engageable with the stud bolt.

3. The canopy mounting device as recited in claim 2, wherein the stopper head is made from a soft material with shock-absorbing property.

4. The canopy mounting device as recited in claim 1, wherein the interlocking ring is pivotably held on the bracket by means of a sliding pin.

5. The canopy mounting device as recited in claim 1, wherein the gas spring is installed between the canopy and the vehicle body to have a dead retraction stroke and a dead extension stroke and wherein the stopper has an adjustable height greater than an angular movement extent of the hinge block that corresponds to the dead extension stroke.

6. The canopy mounting device as recited in claim 5, further comprising a fixture block anchored to the vehicle body, the fixture block having a vertical slot, and a coupling pin inserted through the vertical slot to pivotally affix the piston rod of the gas spring to the fixture block.

\* \* \* \* \*